(12) United States Patent
Cahill et al.

(10) Patent No.: US 6,823,076 B2
(45) Date of Patent: Nov. 23, 2004

(54) METHOD FOR EMBEDDING DIGITAL INFORMATION IN A THREE DIMENSIONAL IMAGE FROM A SCANNERLESS RANGE IMAGING SYSTEM

(75) Inventors: Nathan D. Cahill, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 676 days.

(21) Appl. No.: 09/910,213

(22) Filed: Jul. 20, 2001

(65) Prior Publication Data

US 2003/0048921 A1 Mar. 13, 2003

(51) Int. Cl.$^7$ ................................................ G06K 9/00
(52) U.S. Cl. ........................ 382/100; 382/232; 380/54; 713/176
(58) Field of Search ................................ 382/100, 232, 382/158; 348/460; 380/287, 54, 55; 713/176, 175

(56) References Cited

U.S. PATENT DOCUMENTS

| | | | |
|---|---|---|---|
| 4,953,616 A | | 9/1990 | Borden et al. ............. 166/66.4 |
| 5,859,920 A | | 1/1999 | Daly et al. .................. 382/115 |
| 6,044,156 A | * | 3/2000 | Honsinger et al. ............ 380/54 |
| 6,118,946 A | * | 9/2000 | Ray et al. ..................... 396/89 |

OTHER PUBLICATIONS

U.S. patent application Ser. No. 09/074,282, Honsinger et al., filed May 7, 1998.
U.S. patent application Ser. No. 09/575,522, Ray et al., filed May 17, 2000.

"Distortion–Free Data Embedding for Images" by Miroslav Goljam, Jessica J. Fridrich and Rui Du. 4th Information Hiding Workshop—Apr. 2001, pp. 1–15.

"New Fragile Authentication Watermark for Images" by Jiri Fridrich, Miroslav Goljan, and Arnold C. Baldoza. ICIP 2000, Sep. 10–13, 2000.

"Invertible Authentication" by Jiri Fridrich, Miroslav Goljan, and Rui Du. SPIE—Security and Watermarking of Multimedia Contents, Jan. 2001.

* cited by examiner

*Primary Examiner*—Bhavesh M. Mehta
*Assistant Examiner*—Ali Bayat
(74) *Attorney, Agent, or Firm*—David M. Woods

(57) ABSTRACT

A scannerless range imaging system employs a technique for embedding digital data into its image output in a manner that allows exact recovery of its associated images. The range imaging system captures (a) a plurality of phase images of reflected modulated illumination, wherein each image incorporates a phase delay term corresponding to the distance of objects in the scene from the range imaging system, together with a phase offset term unique for each image, and (b) at least one intensity image of reflected unmodulated illumination, and then generates an image bundle of associated images including the plurality of phase images and the intensity image. Meta-data is embedded into the image bundle by a) forming a digital message from the meta-data, b) converting the digital message to embedded data, and c) adding the embedded data to each phase image in the image bundle, pixel by pixel, without changing the phase term in each of the phase images, thereby allowing exact reconstruction of range information from the phase images without having to extract the embedded data.

12 Claims, 6 Drawing Sheets

_US 6,823,076 B2_

METHOD FOR EMBEDDING DIGITAL INFORMATION IN A THREE DIMENSIONAL IMAGE FROM A SCANNERLESS RANGE IMAGING SYSTEM

FIELD OF THE INVENTION

The invention relates generally to the field of digital image processing, and in particular to the field of embedding digital data in an original image in such a manner that the embedded data can be completely removed at a later time to allow lossless recovery of the original image.

BACKGROUND OF THE INVENTION

In some digital imaging systems, it is desirable to convey ancillary information along with the actual data that comprises an original image. This ancillary information might be directly derived from the image, or it might represent additional information that is related to, but not directly derived from, the image itself. In either case, this ancillary information is called image "meta-data" throughout this text.

An example of meta-data that is directly derived from the original image data is a hash value. A hash value is a very compact representation of the much larger original image data set, and it is generated using a hashing function. An example of a useful hashing function is found in U.S. Department of Commerce Technology Administration National Institute of Standards and Technology, FIPS PUB 180, "Secure Hash Standard," May 11, 1993, pp. 1–20. This hashing function will produce a hash value of length 162 bits, irrespective of the number of pixel values that are input to the hashing function. Other hashing functions may produce hash values of lengths other than 162 bits. While a hash value is not entirely unique to a given image (i.e., the process is a many-to-one mapping), it can be chosen so as to represent the image with extremely high probability. A hash value can be appended to the original image and then used at a later time to verify that the image has not been modified in any way since the hash value was generated. To prevent tampering with the hash value by unauthorized individuals, it is necessary to encrypt the hash value, thus creating a secure digital signature for the original image data. However, the process of appending the encrypted hash value inhibits the use of standard image formats such as TIFF to convey the combined image and signature information. Furthermore, a signature that is merely appended to an image can be easily removed by deleting the portion of the file containing the signature.

Examples of image meta-data that are not directly derived from, but are related to, the original image include the date/time or geographical location of the point of capture, a unique ID associated with the camera and/or photographer, camera settings used during the capture process, etc. It is possible to merely append such meta-data to the image data, but as with the digital signatures this process inhibits the use of standard image file formats. Some file formats provide segments for user-defined information, but such data is unsecured from tampering and could be easily removed by unauthorized individuals. In present techniques, these issues are resolved by embedding the meta-data within the image itself. Standard image file formats such as TIFF can then be used to convey both image data and meta-data, and proper design of the embedding process allows the image containing the embedded data to be directly viewed with only a minimal loss in quality. The embedding process also provides some level of security in that the meta-data can only be recovered with some knowledge of the embedding process (such as a "key" value). However, a disadvantage of the embedding process is that the original image data is typically corrupted to the extent that exact recovery of the original values is impossible. As a result, many current data embedding techniques could not be used for the purpose of image verification where the encrypted hash values (i.e., image signatures) are embedded in the image itself (since the proper hash value could never be re-created from the corrupted image values).

Recent techniques have been proposed that address this issue (see commonly assigned U.S. patent application Ser. No. 09/074,282 entitled "Lossless Recovery of an Original Image Containing Embedded Data", which was filed May 7, 1998 in the names of Honsinger, C., Jones, P., Rabbani, M., and Stoffel, J.; an article by Fridrich, J., Goljan M., and Du, R.,"Invertible Authentication", _Proc. SPIE Security and Watermarking of Multimedia Contents_, January, 2001; and an article by Goljan, M., Fridrich, J., and Du, R., "Distortion-free Data Embedding for Images", _Proc. 4th Information Hiding Workshop_, April, 2001). Each describes embedding methods by which the original image values can be recovered exactly after extraction of the embedded data. For example, in one method described in each of these sources, the embedded data may be combined with the original image using a reversible transform, e.g., a modulo-N addition, to form a digital image containing the embedded data. For general imaging systems, these data embedding methods will suffice to re-create the original image.

If a scannerless range imaging system is considered, a new data embedding method can be used that provides advantages over all of the current data embedding methods described for general imaging systems. U.S. Pat. No. 4,953, 616 describes a scannerless range imaging system (further described in the Sandia Lab News, vol. 46, No. 19, Sep. 16, 1994) using either an amplitude-modulated high-power laser diode or an array of amplitude-modulated light emitting diodes (LEDs) to completely illuminate a target scene. An improved scannerless range imaging system that is capable of yielding color intensity images in addition to the 3D range images is described in commonly-assigned, copending U.S. patent application Ser. No. 09/572,522, filed May 17, 2000 and entitled "Method and Apparatus for a Color Scannerless Range Imaging System". (As used herein, a scannerless range imaging (SRI) system will sometimes be referred to as an "SRI camera".) In the formation of a three-dimensional image (which will herein refer to the combination of the intensity image and the range image), the SRI camera generates an "image bundle", which includes both the intensity image and a collection of phase images which are used to construct the range image.

It would be desirable to have an embedding technique that would incorporate the above-mentioned advantages in a three-dimensional image of the type captured by an SRI camera. However, there are several problems that need to be addressed. In particular, it would be desirable to embed any meta-data in the three-dimensional image formed by an SRI camera such that the range data can be exactly reconstructed from the altered image without having to extract the embedded data. Moreover, it would be beneficial if the data does not have to be embedded in the intensity or range images (or the three-dimensional image), so the original image values of the intensity and range images are not altered.

SUMMARY OF THE INVENTION

The present technique is an improvement based on the technique of data embedding that is described in commonly assigned U.S. Pat. No. 5,859,920, entitled, "Method for Embedding Digital Information in an Image" by Daly et al., and as modified in commonly assigned U.S. Pat. No. 6,044,156, entitled, "Method for Generating an Improved Carrier for use in an Image Data Embedding Application" by Honsinger et al., both of which are incorporated herein by reference. More specifically, the present invention extends these data embedding techniques for use in a scannerless range imaging system. However, in a departure from the prior art, the embedded data is combined with the phase image(s) rather than the original pictorial image. As will be further seen, this leads to unexpected benefits in the recovery of the phase images themselves.

The present invention is directed to overcoming one or more of the problems set forth above. Briefly summarized, according to one aspect of the present invention, the invention resides in a method for embedding data into the output of a scannerless range imaging system of the type that includes an illumination system for controllably illuminating a scene with modulated illumination and an image capture device positioned in an optical path of the reflected illumination from the scene for capturing a plurality of images, including (a) a plurality of phase images of the reflected modulated illumination, wherein each phase image incorporates a phase delay term corresponding to the distance of objects in the scene from the range imaging system, together with a phase offset term unique for each phase image, and (b) at least one intensity image of reflected unmodulated illumination. The images are stored as a bundle of associated images including the plurality of phase images and the intensity image. In accordance with the improved method, meta-data is embedded into the image bundle in a manner that allows exact recovery of the associated images, by employing the steps of a) forming a digital message from the meta-data; b) converting the digital message to embedded data; and c) adding the embedded data to each phase image in the image bundle, pixel by pixel, without changing the phase term in each of the phase images, thereby allowing exact reconstruction of range information from the phase images without having to extract the embedded data.

Using this technique, the image meta-data associated with an original intensity image, range image, or three-dimensional image is first converted to a spatial representation called the message data. Prior to this conversion, the meta-data may also be encrypted for additional security. The message data is then embedded into the original phase offset images in the image bundle through the use of a carrier signal as described in the afore-mentioned U.S. Pat. No. 6,044,156. The carrier used in the embedding process is generated using an embedding key value, which may be publicly known or may be held private in order to prevent unauthorized access to the message data. Since the embedding process is only applied to the phase offset images in the image bundle, the intensity image, range image, or three-dimensional image remains unaltered. Knowledge of the key allows the message data to be extracted from the image containing the embedded data, and the meta-data can then be recovered from the message data. In the present invention, the embedded data need not be completely removed from the phase offset images because the intensity, range, and three-dimensional images remain unaltered. Furthermore, if the embedded data contains some hash value or other information that could be used to verify the authenticity of the intensity, range, or three-dimensional images, the range image can be reconstructed exactly from the altered phase offset images, without completely removing the embedded data. Moreover, the intensity image (and/or the range and three-dimensional images), which was not subject to alteration by the embedding process, can be directly authenticated in relation to the hash value recovered from the embedded data.

By embedding the data in the phase images in the image bundle, this data embedding method provides the following advantages over current methods:

1) The data does not have to be embedded in the intensity or range images (or the three-dimensional image), so the original image values of the intensity and range images are not altered, and 2) The range data can be exactly reconstructed from the altered phase offset images (original phase offset images combined with embedded data) without having to extract the embedded data to recover the original phase offset images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
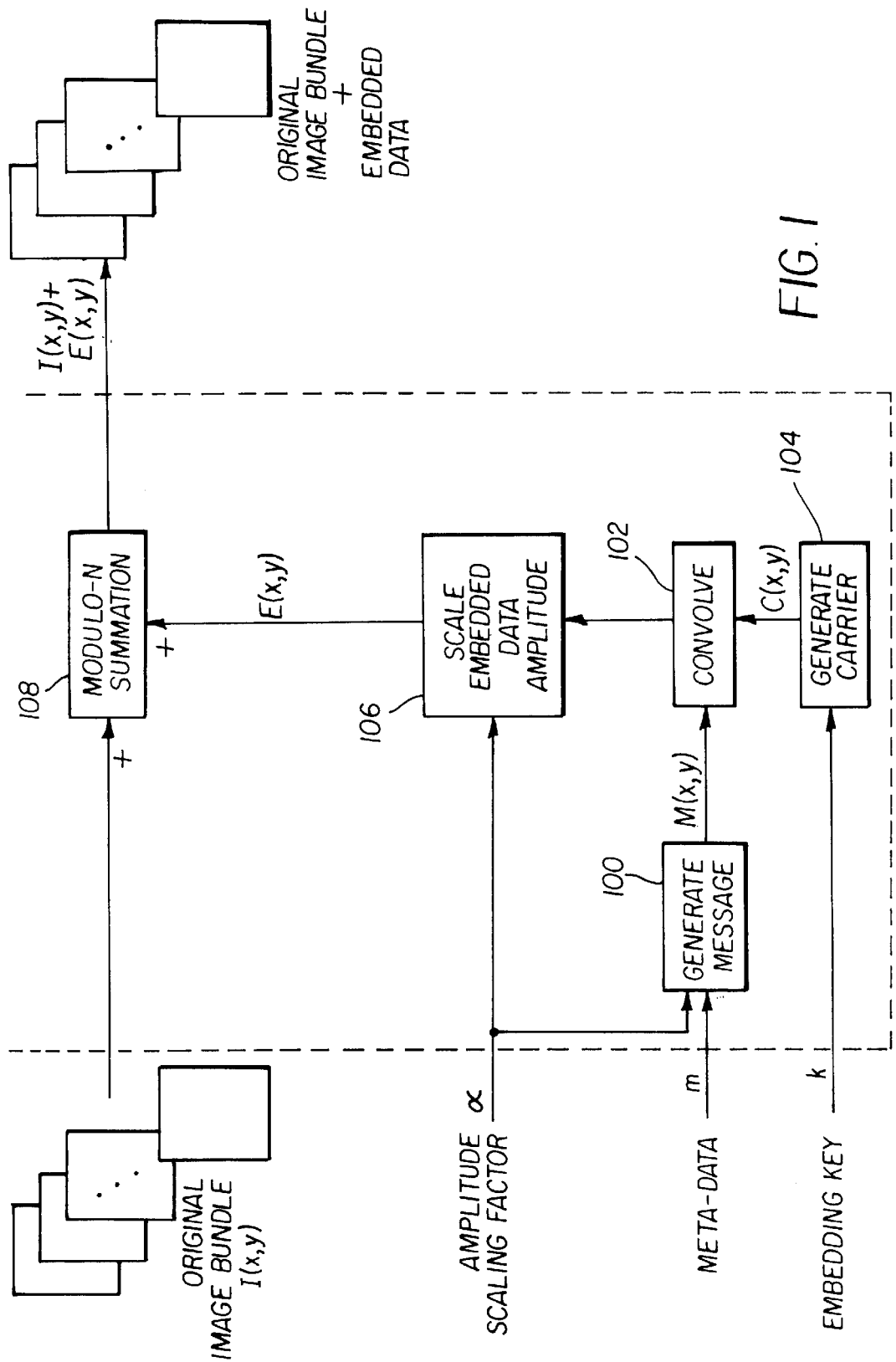
FIG. 1 shows a block diagram according to the invention of a method for embedding meta-data information in an image bundle generated by a scannerless range imaging system.

Because image embedding techniques are well known in a general sense, the present description will be directed in particular to elements forming part of, or cooperating more directly with, the method in accordance with the present invention. Elements used in such methodology that are not specifically shown or described herein may be selected from those known in the art. Certain aspects of the embodiments to be described may be provided in software. Given the methodology as shown and described according to the invention in the following materials, software not specifically shown, described or suggested herein that is useful for implementation of the invention is conventional and within the ordinary skill in such arts.

The technique described in the aforementioned U.S. Pat. No. 6,044,156 is built upon with the present invention to generate an image (from a scannerless range imaging system) containing embedded information (the message). In the present invention, as will be described in greater detail later in this description, the data is embedded in one or more phase images of an image bundle produced by a scannerless range imaging system. The present invention is broken down into two process parts: the process of embedding the message into the phase images in the image bundle; and the process of extracting the embedded message from those phase images.

In the embedding part, the message and a carrier signal are convolved to form a scrambled image. The scrambled image is then scaled to ensure that the amplitude of the resultant scrambled image is not visually perceptible. Next, the scrambled image is added to the original phase images to complete the embedding process. The process of embedding data into one of the phase images is mathematically described as $$I'(x,y)=I(x,y)+\alpha\, M(x,y)*C(x,y) \qquad \text{Eq. (1)}$$

where $I(x,y)$ denotes the original phase image, $I'(x,y)$ denotes the phase image containing the embedded data, $M(x,y)$ denotes the message that is to be embedded in the original phase image, $C(x,y)$ denotes the carrier signal, $M(x,y)*C(x,y)$ denotes the scrambled image, a is an amplitude scaling factor, and * denotes the process of circular convolution. This process is then repeated for each of the phase images.

The convolution of the carrier with the message distributes the message information throughout the spatial extent of the scrambled image. The amplitude scaling $\alpha$ is chosen to be small enough so that the scrambled image is visually undetectable when combined with the original image, but large enough to be recoverable by the message extraction process. When dealing with 8-bit original images where the pixel values range from 0–255, it has been found that a maximum amplitude of 10 or less is adequate to recover an embedded message that does not perceptibly degrade an original image. In some cases, it is possible to use very small amplitudes, such as using only the values±1. It is noted that while we have used an amplitude scaling factor to produce a scrambled image with the desired range of values, it is quite possible to use other methods, either separately or in addition to a scaling factor. Examples include a look-up table, where each input value is mapped to a corresponding output value, or a simple constraint that merely limits the maximum amplitude.

To extract the embedded message, the phase image $I'(x,y)$ containing the embedded data is cross correlated with the carrier, $C(x,y)$, as described by the following:

$$M'(x,y)=I'(x,y)\otimes C(x,y) \qquad \text{Eq. (2)}$$

where $M'(x,y)$ is the extracted message, and $\otimes$ denotes the operation of circular cross correlation. Expanding $I'(x,y)$ in Equation 2 yields:

$$\begin{aligned} M'(x,y) &= [I(x,y)+\alpha M(x,y)*C(x,y)]\otimes C(x,y) \\ &= I(x,y)\otimes C(x,y)+\alpha M(x,y)*[C(x,y)\otimes C(x,y)] \end{aligned} \qquad \text{Eq. (3)}$$

Equation 3 simply states that the extracted message consists of the sum of two components: one term is the cross-correlation of the original image with the carrier signal; and the second term is the autocorrelation of the carrier signal convolved with a scaled version of the original message. The effect of the first term can be minimized by creating a random carrier that is uncorrelated with the original image. From examining the second term, it is clear that the resolvability of the recovered message is affected by the autocorrelation of the carrier signal $C(x,y)$. To achieve maximum resolvability, the autocorrelation of the carrier signal should be a delta function, $\delta(x,y)$, which from Fourier analysis theory is equivalent to suggesting that the carrier signal should contain all frequencies at equal amplitude. Thus, with proper design of the carrier $C(x,y)$ and sufficient amplitude for the embedded data (determined by $\alpha$ or other means), the original message $M(x,y)$ can be recovered exactly.

The preferred design of the carrier is further described in the afore-mentioned co-pending U.S. patent application Ser. No. 09/074,282, which is incorporated herein by reference. Basically, the carrier signal $C(x,y)$ is produced by a carrier generator based upon a string of numbers representing the embedded key k that acts as a seed to a random number generator internal to the carrier generator. Because the carrier is based on a random number generator using an embedded key value, the process of embedding data with this method provides a certain level of security to the embedded information. That is, it is very difficult for an unauthorized individual to extract the embedded information without the key. Additional security could be provided by further encrypting the meta-data using a cryptographically strong system prior to the embedding process.

Although the original message can be recovered exactly, this does not necessarily mean that the original image can be recovered exactly. Referring to Equation 1, the embedding process can be simplified to:

$$I'(x,y)=I(x,y)+E(x,y) \qquad \text{Eq. (4)}$$

where $E(x,y)=\alpha M(x,y)*C(x,y)$ represents the embedded data. Now, given that we have exactly recovered the message $M(x,y)$ and given that we have knowledge of the scaling factor $\alpha$ and carrier $C(x,y)$, we can exactly re-create the embedded data $E(x,y)$. It would seem that we could merely subtract $E(x,y)$ from Equation 4 to recover the original image $I(x,y)$. However, the modified image $I'(x,y)$ is typically constrained to the same range of values as the original image $I(x,y)$, which requires the output of the summation process in Equation 4 to be clipped. This clipping process leads to an irreversible loss of data, and the original image data can never be recovered exactly. To allow the exact recovery of the original image data from the combined image and embedded data, there are several approaches.

One approach for exact recovery is to allow the modified image $I'(x,y)$ containing the embedded data to have a greater range of values than the original image $I(x,y)$. For example, if the original image is represented by n bits, then the modified image might be represented with n+1 bits. However, this approach is not preferred as it may render the modified image unusable in many applications, and it is also inefficient for storage and transmission. For example, an 8-bit original image would produce a 9-bit modified image, and many image file formats and image displays are not designed for bit depths greater than 8 bits/pixel per color.

Another approach is to constrain the possible values of the original image to ensure that clipping does not occur when the embedded data is added to it. This approach may be viable in some systems as the original images may not contain any values at the low and high ends of the possible range (for example, in a digital camera system where the dynamic range is limited due to the sensor, etc.). More generally, the loss of a few codevalues in the bright and dark regions of an image will likely have limited visual impact. However, in a strict sense, this approach does not allow exact recovery of the original image as errors are being introduced even prior to the addition of embedded data.

A better approach, which is described in the aforementioned co-pending U.S. patent application Ser. No. 09/074, 282, and which is incorporated herein by reference, is to use modulo-N addition in place of regular addition in Equation 4. Modulo-N addition is defined as:

$$(a+b) \text{Mod } N = \text{Remainder of } \left\lfloor \frac{a+b}{N} \right\rfloor \qquad \text{Eq. (5)}$$

where $\lfloor x \rfloor$ is the largest integer $\leq x$. In the case of an n-bit original image, N is taken to be $2^n$ (e.g., for an 8-bit image, N is 256). Modulo-N addition ensures that the modified image values (produced by adding the original image values and the embedded data values) will always be in the same range as the original image values. Moreover, the modulo-N addition process is a reversible transform when adding two n-bit values, and thus the original image I(x,y) can be exactly recovered with knowledge of the modified image I'(x,y) and the embedded data E(x,y)

The use of modulo-N addition does lead to one potential artifact in the modified image I'(x,y), namely, certain values in the light and dark portions of the image will be reversed in polarity. Depending on the original image values, this artifact may be completely absent or it may be noticeable when viewing the modified image containing the embedded data. To minimize the occurrence of this artifact, it is necessary to keep the amplitude of the embedded data to a minimum. As discussed previously, the embedded data amplitude also influences the ability to recover the message data exactly, so the choice of the amplitude is a trade-off between visual artifacts in the modified image and the ability to recover the message. A means for minimizing the embedded data amplitude while still allowing exact recovery of the message and hence exact recovery of the original image data is described later.

Figure 3:
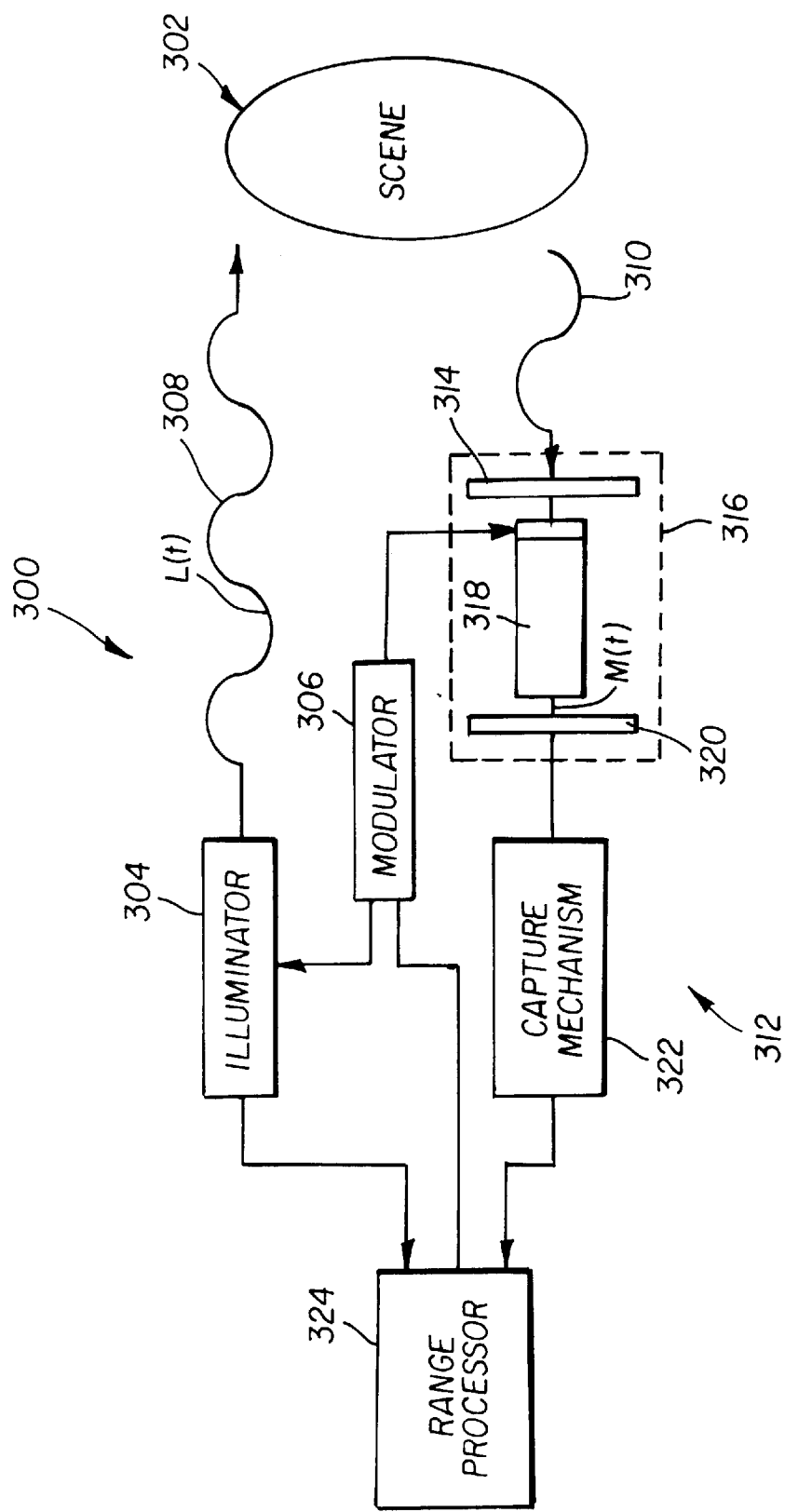
FIG. 3 shows a block diagram of a scannerless range imaging system known in the prior art.

In the present invention, the data is embedded in one or more phase images, referred to hereinafter as phase offset images, of an image bundle produced by a scannerless range imaging system. It is helpful at this point to review the principles and techniques involved in scannerless range imaging. Accordingly, referring to FIG. 3, an SRI camera 300 is shown as a laser radar that is used to illuminate a scene 302 and then to capture an image bundle comprising a minimum of three images of the scene 302. An illuminator 304 emits a beam of electromagnetic radiation whose frequency is controlled by a modulator 306. Typically, in the prior art, the illuminator 304 is a laser device which includes an optical diffuser in order to effect a wide-field illumination. The modulator 306 provides an amplitude varying sinusoidal modulation. The modulated illumination source is modeled by:

$$L(t)=\mu_L+\eta\sin(2\pi\lambda t) \qquad \text{Eq. (6)}$$

where $\mu_L$ is the mean illumination, $\eta$ is the modulus of the illumination source, and $\lambda$ is the modulation frequency applied to the illuminator 304. The modulation frequency is sufficiently high (e.g., 12.5 MHz) to attain sufficiently accurate range estimates. The output beam 308 is directed toward the scene 302 and a reflected beam 310 is directed back toward a receiving section 312. As is well known, the reflected beam 310 is a delayed version of the transmitted output beam 308, with the amount of phase delay being a function of the distance of the scene 302 from the range imaging system. The reflected beam 310 strikes a photocathode 314 within an image intensifier 316, thereby producing a modulated electron stream proportional to the input amplitude variations. The output of the image intensifier 316 is modeled by:

$$M(t)=\mu_M+\gamma\sin(2\pi\lambda t) \qquad \text{Eq. (7)}$$

where $\mu_M$ is the mean intensification, $\gamma$ is the modulus of the intensification and $\lambda$ is the modulation frequency applied to the intensifier 316. The purpose of the image intensifier is not only to intensify the image, but also to act as a frequency mixer and shutter. Accordingly, the image intensifier 316 is connected to the modulator 306, causing the gain of a microchannel plate 318 to modulate. The electron stream from the photocathode 314 strikes the microchannel plate 318 and is mixed with a modulating signal from the modulator 306. The modulated electron stream is amplified through secondary emission by the microchannel plate 318. The intensified electron stream bombards a phosphor screen 320, which converts the energy into a visible light image. The intensified light image signal is captured by a capture mechanism 322, such as a charge-coupled device (CCD). The captured image signal is applied to a range processor 324 to determine the phase delay at each point in the scene. The phase delay term $\omega$ of an object at a range $\rho$ meters is given by:

$$\omega = \frac{2\rho\lambda}{c}\text{mod}2\pi \qquad \text{Eq. (8)}$$

where c is the velocity of light in a vacuum. Consequently, the reflected light at this point is modeled by:

$$R(t)=\mu_L+\kappa\sin(2\pi\lambda t+\omega) \qquad \text{Eq. (9)}$$

where $\kappa$ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \qquad \text{Eq. (10)}$$

In the range imaging system disclosed in the aforementioned U.S. Pat. No. 4,953,616, which is incorporated herein by reference, a reference image is captured during which time the micro-channel plate is not modulated, but rather kept at a mean response. The range is estimated for each pixel by recovering the phase delay term as a function of the value of the pixel in the reference image and the phase image.

A preferred, more robust approach for recovering the phase delay term is described in U.S. Pat. No. 6,118,946, entitled "Method and Apparatus for Scannerless Range Image Capture Using Photographic Film", which is incorporated herein by reference. Instead of collecting a phase image and a reference image, this approach collects at least three phase images (referred to as an image bundle). This approach shifts the phase of the intensifier 316 relative to the phase of the illuminator 304, and each of the phase images has a distinct phase offset. For this purpose, the range processor 324 is suitably connected to control the phase offset of the modulator 306, as well as the average illumination level and such other capture functions as may be necessary. If the image intensifier 316 (or laser illuminator 304) is phase shifted by $\theta_i$, the pixel response from equation (10) becomes:

$$P_i=2\mu_L\mu_M\pi+\kappa\pi\gamma\cos(\omega+\theta_i) \qquad \text{Eq. (11)}$$

It is desired to extract the phase delay term $\omega$ from the expression. However, this term is not directly accessible from a single image. In equation (11) there are three unknown values and the form of the equation is quite simple. As a result, mathematically only three samples (from three images) are required to retrieve an estimate of the phase delay term, which is proportional to the distance of an object in the scene from the imaging system. Therefore, a set of three images captured with unique phase shifts is sufficient to determine ω. For simplicity, the phase shifts are given by $\theta_k=2\pi k/3$; k=0,1,2. In the following description, an image bundle shall be understood to include a collection of images which are of the same scene, but with each image having a distinct phase offset obtained from the modulation applied to the intensifier 316. The image bundle may also include the estimated range image, and any intensity (including color, as described in the aforementioned U.S. patent application Ser. No. 09/572,522, which is incorporated by reference herein) image of the same scene. It should also be understood that an analogous analysis can be performed by phase shifting the illuminator 304 instead of the intensifier 316. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with n≧3 distinct phase offsets of the intensifier (or laser or a combination of both) these images form part of the image bundle. Applying Equation (11) to each phase offset image in the image bundle and expanding the cosine term (i.e., $P_i=2\mu_L\mu_M\pi+\kappa\pi\gamma(\cos(\omega)\cos(\theta_i)-\sin(\omega)\sin(\theta_i)))$ results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{Eq. (12)}$$

where $\Lambda_1=2\mu_L\mu_M\pi$, $\Lambda_2=\kappa\pi\gamma\cos\omega$, and $\Lambda_3=\kappa\pi\gamma\sin\omega$. This system of equations is solved by a singular value decomposition to yield the vector $\Lambda=[\Lambda_1,\Lambda_2,\Lambda_3]^T$. Since this calculation is carried out at every (x,y) location in the phase offset images of the image bundle, Λ is really a vector image containing a three element vector at every point. The phase delay term ω is computed at each point using a four-quadrant arctangent calculation:

$$\omega=\tan^{-1}(\Lambda_3,\Lambda_2) \quad \text{Eq. (13)}$$

The resulting collection of phase values at each point forms the phase image. Once phase has been determined, range r can be calculated by:

$$r = \omega\frac{c}{4\pi\lambda} \quad \text{Eq. (14)}$$

Equations (6)–(14) thus describe a method of estimating range using an image bundle with at least three images (i.e., n=3) corresponding to distinct phase offsets of the intensifier and/or illuminator.

In the present invention, the data is embedded in the phase offset images of the image bundle of the scannerless range imaging system. As described earlier, embedding data in the phase offset images has two advantages; namely, 1) The data does not have to be embedded in the intensity or range images (or the three-dimensional image), so the original image values of the intensity and range images are not altered, and 2) The range data can be exactly reconstructed from the altered phase offset images (original phase offset images combined with embedded data) without having to extract the embedded data to recover the original phase offset images.

The first advantage follows from the fact that the data is embedded in the phase offset images, instead of the intensity or range images (or the three-dimensional image). In order to show that the current invention has the second advantage, consider a given position (x,y) in the phase offset images. When the embedded data ê E(x,y) is added, it yields an altered phase offset value $\hat{P}_i$. From Eq. 11, we can say:

$$\hat{P}_i=2\mu_L\mu_M\pi+\kappa\pi\gamma\cos(\omega+\theta_i)+\hat{e} \quad \text{Eq. (15)}$$

Applying Equation (15) to each altered phase offset image in the image bundle and expanding the cosine term (i.e., $\hat{P}_i=2\mu_L\mu_M\pi+\hat{e}+\kappa\pi\gamma(\cos(\omega)\cos(\theta_i)-\sin(\omega)\sin(\theta_i)))$ results in the following system of linear equations in n unknowns at each point:

$$\begin{pmatrix} \hat{P}_1 \\ \hat{P}_2 \\ \vdots \\ \hat{P}_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{Eq. (16)}$$

where $\Lambda_1=2\mu_{LM}\pi+\hat{e}$, $\Lambda_2=\kappa\pi\gamma\cos\omega$, and $\Lambda_3=\kappa\pi\gamma\sin\omega$. The sin ω. The phase delay term ω is computed at each point using the same formula as Eq. 13:

$$\omega=\tan^{-1}(\Lambda_3,\Lambda_2)$$

Therefore, since the embedded data term ê only affects $\Lambda_1$ (i.e., $\Lambda_2$ and $\Lambda_3$ are independent of ê), the phase delay term ω, and hence, the range r does not change when computed with phase offset images that are altered by adding the embedded data.

Thus, after the embedded data has been extracted from the altered phase offset images, it is not necessary to undertake additional steps to recover the original phase offset images. In fact, the exact range image can be reconstructed directly from the altered phase offset images, bypassing the need to recover the original phase offset images. Because of this advantage, a wide variety of data embedding techniques can be employed, even techniques that do not allow for recovery of the original image. In the preferred embodiment, however, an invertible data embedding technique, such as the one described in the afore-mentioned co-pending U.S. patent application Ser. No. 09/074,282, is used in case it is desirable to recover the original phase offset images for any purpose. Because the range image can be reconstructed exactly from the altered phase offset images, this invention can be used in a system for authentication of three-dimensional images from a SRI camera that does not alter the intensity, range, or three-dimensional images themselves.

Referring now to FIG. 1, implementation of the preferred embodiment of the data embedding apparatus is performed by providing as inputs the following values: 1) a string of n-bit original pixel values derived from the original phase offset images, denoted as I(x,y); 2) an embedded data amplitude scaling factor α; 3) a string of bits m, representing meta-data information that is to be embedded within the original phase image values; and 4) a string of numbers called an embedding key k (which may be private or public). The meta-data could include one or more of the following pieces of information: (1) a hash value generated by applying a hashing function to the intensity image, range image, or three dimensional image, (2) additional information about the image bundle, such as the number of phase offset images and/or the corresponding phase offset values, (3) date/time and/or geographical location of the point of capture, (4) a unique ID associated with the camera and/or photographer, (5) camera settings during the capture process, (6) any other information or data relevant to the image, camera, photographer, or application.

The amplitude scaling factor α is sent to a message generator 100, where it is combined with the meta-data information m to produce a spatial domain message M(x,y). Embedding the amplitude scaling factor in the phase image itself eliminates the need to send it as separate side information. However, because the data embedding process can only embed a finite number of bits of total information, it is desirable to limit the number of bits used to represent α. As noted previously, it is generally sufficient to limit the maximum embedded data amplitude to a value of 10 or less, so it is entirely possible to use only 3 or 4 bits to represent α. Although a variety of methods could be used to generate M(x,y) from the combined meta-data information and amplitude scaling factor, a preferred embodiment is to place delta functions in a periodic array, where the amplitude of the delta functions is modulated by the string of binary values that represent the combined information. The generated message M(x,y) is then directed to a convolver 102, where it is circularly convolved with a random spatial domain carrier signal C(x,y) to produce two-dimensional embedded data.

The carrier signal C(x,y) is produced by a carrier generator 104 based upon a string of numbers representing the embedding key k that acts as a seed to a random number generator internal to carrier generator 104. Because the carrier is based on a random number generator using an embedded key value, the process of embedding data with this method provides a certain level of security to the embedded information. That is, it is very difficult for an unauthorized individual to extract the embedded information without the key. As mentioned earlier, additional security could be provided by further encrypting the meta-data using a cryptographically strong system prior to the embedding process.

The output of the convolver 102 is directed to an embedded data amplitude scaler 106. The scaler 106 also receives as an input the amplitude scaling factor α. Scaler 106 scales the output of the convolver according to α, producing the spatial domain scaled embedded data E(x,y). The scaled embedded data values E(x,y) and the original phase image pixel values I(x,y) are sent to modulo-N summator 108, where $N==2^n$ for n-bit input pixel values. The summation performed by the modulo-N summator 108 combines the two inputs at all corresponding spatial locations to provide a stream of original phase image pixel values modified with corresponding embedded pixel values, denoted as I(x,y)+E(x,y). Each value in this modified stream is represented with n bits.

Figure 2:
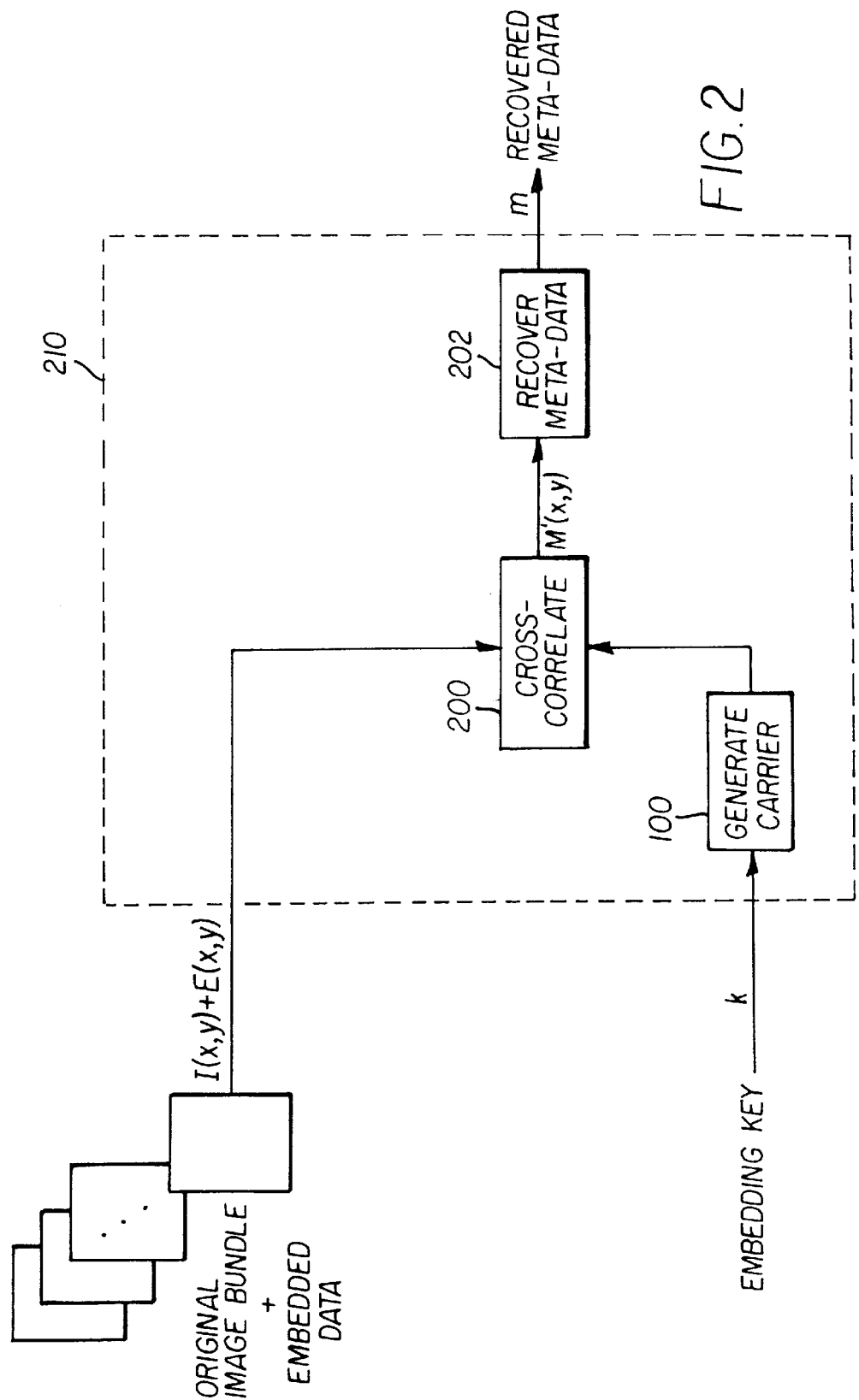
FIG. 2 shows a block diagram of a method for extracting meta-data information from an image bundle of the type described in FIG. 1.

Referring now to FIG. 2, wherein an apparatus for embedded message extraction is illustrated. The inputs to the embedded message extraction and image recovery apparatus are: 1) the n-bit per pixel stream representing the combination of the original phase image I(x,y) and its embedded data E(x,y); and 2) the string of values representing the same embedding key k used for the data embedding process in FIG. 1. The image with its embedded data stream is directed to a cross-correlator 200.

The embedding key k is sent to a carrier generator 100 that is identical to that used in FIG. 1. The resulting carrier signal C(x,y) is sent to cross-correlator 200. The cross-correlator 200 performs a circular cross-correlation on the carrier signal C(x,y) and the image and embedded message stream I(x,y)+E(x,y) to produce the recovered message M'(x,y). The recovered message is then sent to recovery circuit 202 which recovers the meta-data information m.

Figure 4:
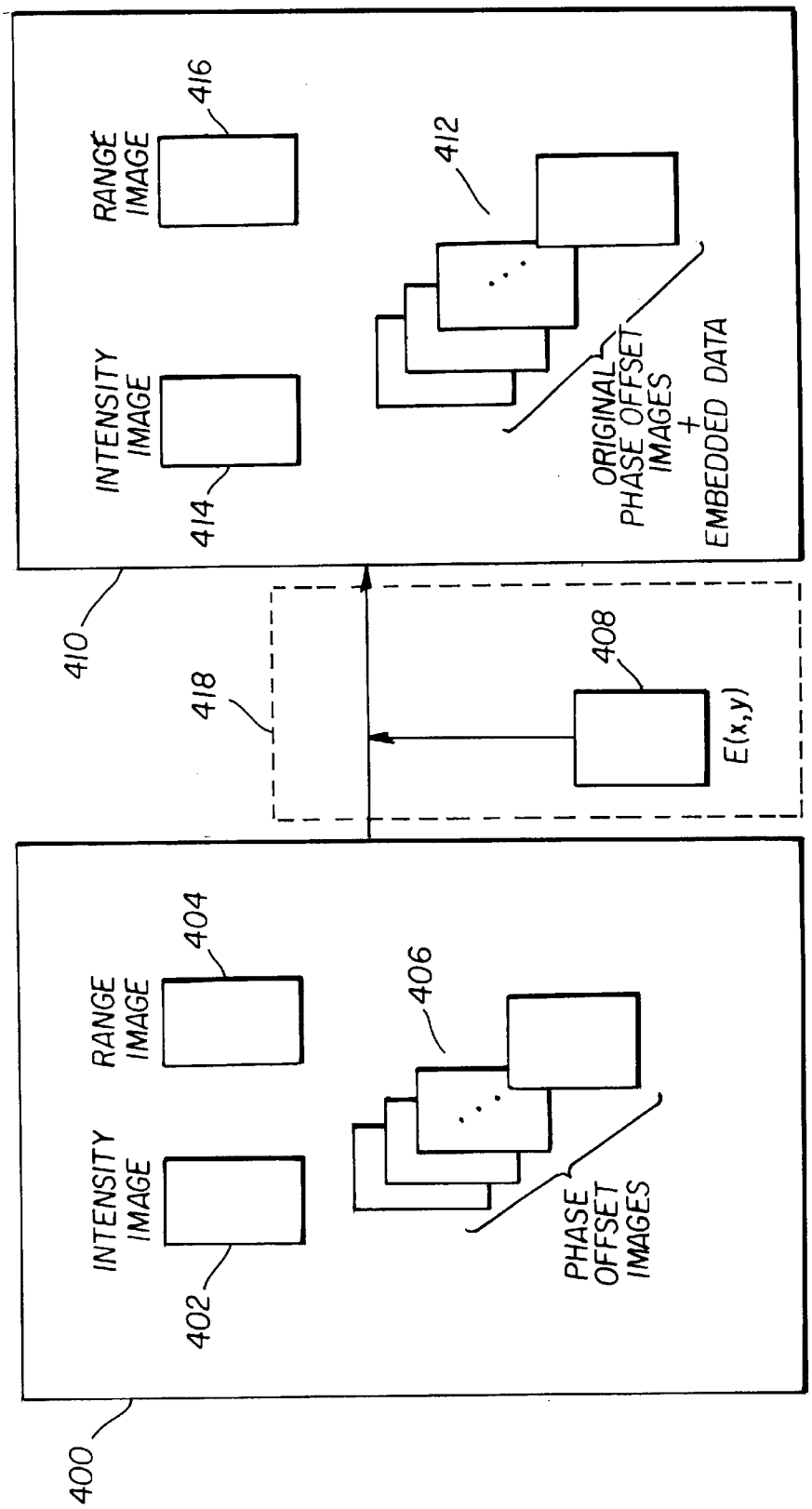
FIG. 4 illustrates an image bundle of the type produced by a scannerless range imaging system, including data embedding in accordance with the invention.

Referring now to FIG. 4, the image bundle 400 from a scannerless range imaging system may include the components of an intensity image 402 and several phase offset images 406. In addition, the image bundle 400 may also include a range image 404 generated from the phase offset images 406. (Alternatively, the range image 404 may be subsequently generated by post-processing of the phase offset images 406 and stored separately from the image bundle.) The data E(x,y) 408 to be embedded is added to each phase offset image by a system 418 as described in FIG. 1, yielding an altered image bundle 410 containing altered phase offset images 412, but with the same (unaltered) intensity image 414 and range image 416. Since the embedded data does not need to be extracted in order to reconstruct the range data from the altered phase offset images, a preferred embodiment of this invention involves an image authentication scheme, whereby a range image 404 can be determined to have been altered without either extracting the embedded data, or recovering the original phase offset images.

Figure 5:
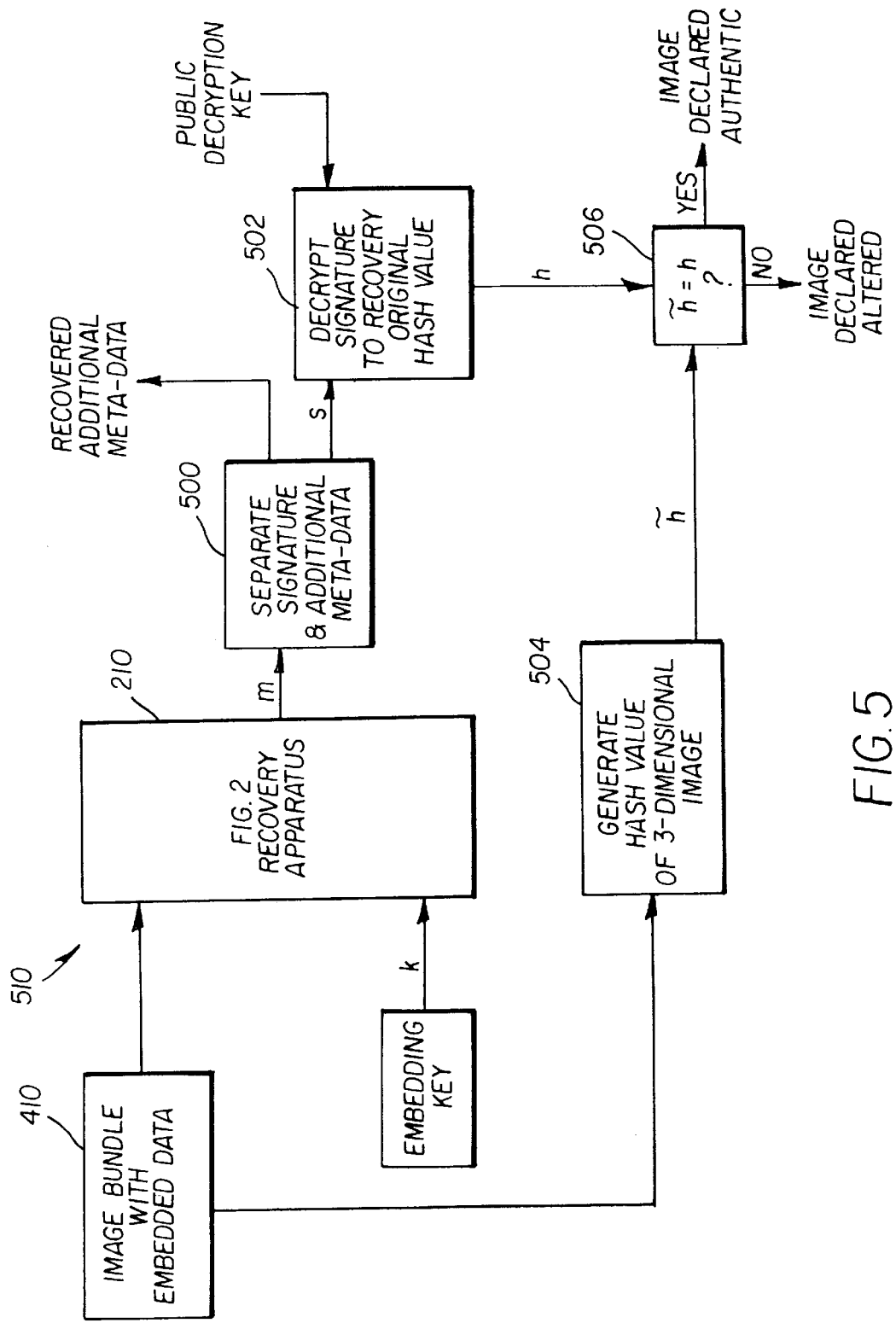
FIG. 5 shows a block diagram of a method for authenticating an image bundle containing an embedded digital signature.

FIG. 5 illustrates apparatus 510 for the recovery of the digital signature from the embedded image bundle data and its subsequent use in verifying the authenticity of the received three-dimensional image. The image bundle 410 containing the phase offset images with embedded data $\tilde{P}_i(x,y)+E(x,y)$ is directed as input to the apparatus 210 as shown in FIG. 2 for embedded message extraction, where $\tilde{P}_i(x,y)$ indicates that the received phase offset image may be an altered version of the original phase offset image $P_i(x,y)$. The embedding key k is also sent as input to the FIG. 2 apparatus. The output of the apparatus 210 is the total embedded meta-data information m, which includes the digital signature. The digital signature encrypts a hash value generated from the original intensity image, the range image and/or the three-dimensional image.

The total meta-data information is directed to a separator circuit 500 that separates the meta-data information into the digital signature s and any additional meta-data. The signature is then sent to a decryption circuit 502 where the original hash value h is recovered. The decryption circuit also requires a string of values called a decryption key. As noted previously, it is common for the encryption key to be held privately so that only authorized users can create valid signatures. However, the corresponding decryption key is often made public so that any individual can authenticate an image given its digital signature. Such a system is called a private/public key system.

The intensity, range, or three dimensional image from the image bundle 410 is sent to a hash value generator 504. The resulting hash value $\tilde{h}$ is directed to a hash value comparator circuit 506 where it is compared to the original hash value recovered from the meta-data. If the hash values are identical, then the intensity, range, or three dimensional image is declared to be authentic. If they differ, the image is declared to be altered.

Figure 6:
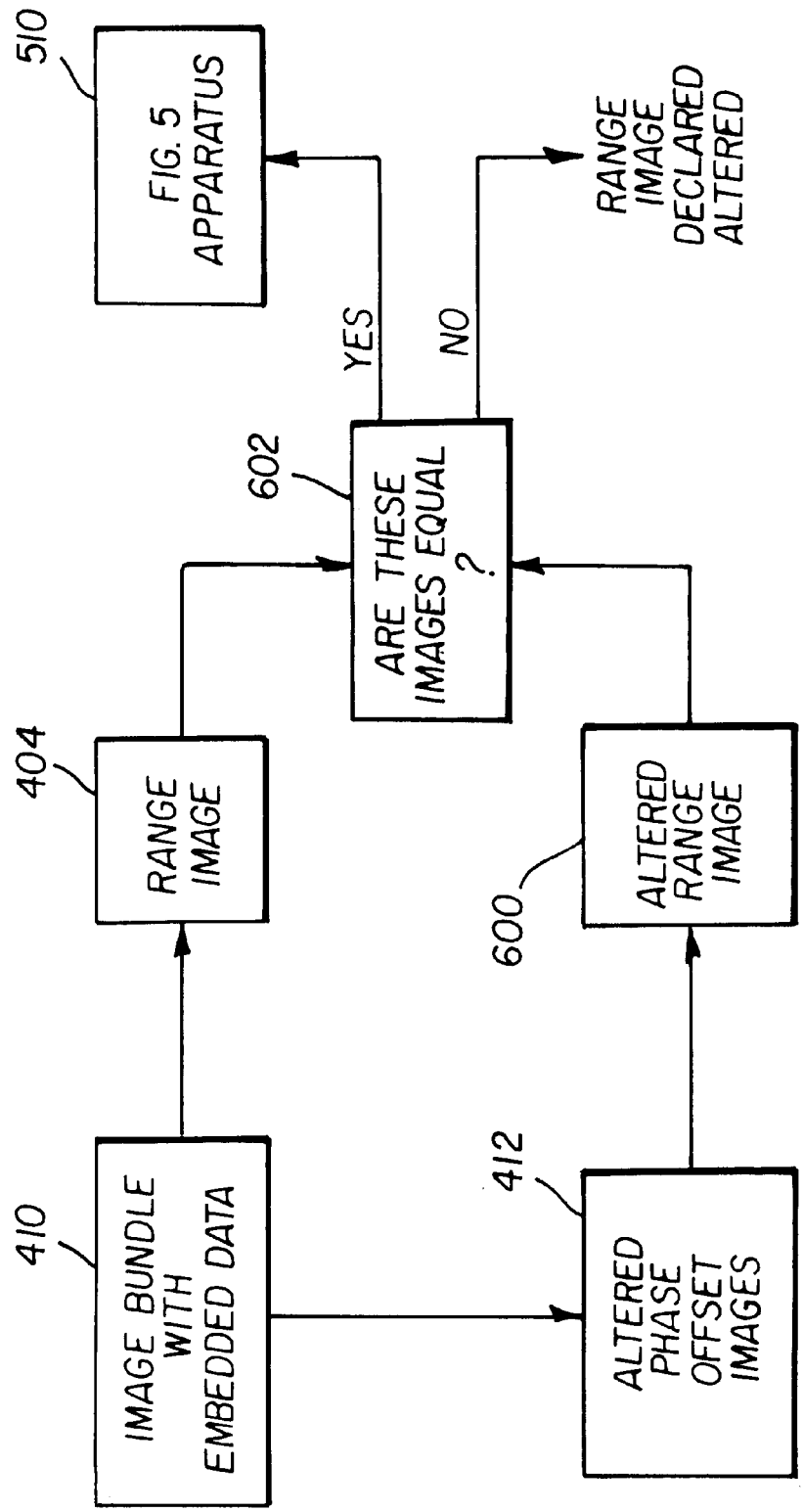
FIG. 6 shows a block diagram of a method for authenticating a range or three-dimensional image without extracting the embedded data.

FIG. 6 illustrates an embodiment whereby an altered range or three-dimensional image can be identified from the embedded image bundle data without extracting the embedded data. The image bundle containing the phase offset images with embedded data $\tilde{P}_i(x,y)+E(x,y)$ is directed as input to the apparatus 210 as shown in FIG. 2 for embedded message extraction, where $\tilde{P}_i(x,y)$ indicates that the received phase offset image may be an altered version of the original phase offset image $P_i(x,y)$. The altered phase offset images 412 are used in a computation circuit 600 to compute an alternate range image as described by Equations (16), (13), and (14). The range image from the image bundle and the alternate range image are directed to a range image comparator circuit 602.

If the range image and alternate range image differ, the range image is declared to be altered. On the other hand, if the range image and the alternate range image are equivalent, there is not yet enough information to conclude that the range image is authentic. (For instance, the altered phase offset images could have been corrupted just enough so as to match a corrupted range image.) Consequently, if they are equivalent, the embedded image bundle is directed to the apparatus 510 as shown in FIG. 5 to recover the metadata. As described in relation to FIG. 5, the intensity image, range image or three dimensional image from the image bundle 410 is sent to the hash value generator 504. The resulting hash value $\hat{h}$ is directed to the hash value comparator circuit 506 where it is compared to the original hash value recovered from the meta-data. If the hash values are identical, then the corresponding intensity, range or three dimensional image is declared to be authentic. If they differ, the image is declared to be altered.

The invention has been described with reference to a preferred embodiment. However, it will be appreciated that variations and modifications can be effected by a person of ordinary skill in the art without departing from the scope of the invention.

Parts List

| | |
|---|---|
| 100 | message generation step |
| 102 | convolution step |
| 104 | carrier generation step |
| 106 | scale embedded data amplitude step |
| 108 | modulo-N summation step |
| 200 | cross correlation step |
| 202 | meta-data recovery step |
| 210 | apparatus for embedded message extraction |
| 300 | SRI camera |
| 302 | scene |
| 304 | illuminator |
| 306 | modulator |
| 308 | output beam |
| 310 | reflected beam |
| 312 | receiving section |
| 314 | photocathode |
| 316 | image intensifier |
| 318 | microchannel plate |
| 320 | phosphor screen |
| 322 | capture mechanism |
| 324 | range processor |
| 400 | image bundle |
| 402 | intensity image |
| 404 | range image |
| 406 | phase offset images |
| 408 | embedded data |
| 410 | image bundle with embedded data |
| 412 | phase offset images with embedded data |
| 414 | intensity image |
| 416 | range image |
| 418 | data embedding step |
| 500 | separator step |
| 502 | decryption step |
| 504 | generating hash value step |
| 506 | hash value comparison step |
| 510 | recovery apparatus |
| 600 | altered range image computation |
| 602 | image comparison step |

What is claimed is:

1. In a method for embedding data into the output of a scannerless range imaging system of the type that includes an illumination system for controllably illuminating a scene with modulated illumination and an image capture device positioned in an optical path of the reflected illumination from the scene for capturing (a) a plurality of phase images of the reflected modulated illumination, wherein each phase image incorporates a phase delay term corresponding to the distance of objects in the scene from the range imaging system, together with a phase offset term unique for each image, and (b) at least one intensity image of reflected unmodulated illumination, said system generating an image bundle of associated images including the phase images and the intensity image, the improvement wherein data is embedded into the image bundle in a manner that allows exact recovery of one or more of the associated images, said improvement comprising the steps of:

a) forming a digital message from the data;

b) converting the digital message to embedded data; and c) altering the phase images by adding the embedded data to each phase image in the image bundle, pixel by pixel, while leaving the phase term in each of the phase images unchanged, thereby allowing exact reconstruction of range information from the altered phase images without having to extract the embedded data.

2. The method as claimed in claim 1 wherein the step b) of converting the digital message to embedded data comprises the steps of:

a) generating a random phase carrier; and b) convolving the digital message and the random phase carrier to form the embedded data.

3. The method as claimed in claim 1 wherein the image capture device captures a plurality of phase images of the reflected modulated illumination, wherein each phase image incorporates the effect of a predetermined modulation frequency together with a phase offset unique for each image.

4. The method as claimed in claim 3 wherein each unique phase offset $\theta$ is given by $\theta_i=2\pi i/3$; $i=0,1,2$.

5. The method as claimed in claim 1 wherein the data includes a digital signature for the intensity image formed by the steps of:

a) generating a hash value from the intensity image; and b) encrypting the hash value using a private key to form the digital signature.

6. The method as claimed in claim 5 further comprising a method for authenticating the image bundle by the steps of:

extracting the embedded data from the altered phase images;

separating the digital signature from the embedded data;

decrypting the digital signature to recover the hash value; and comparing the decrypted hash value with a hash value generated from the intensity image.

7. The method as claimed in claim 5 wherein the image bundle further includes a range image generated from the phase offset images, and said method further authenticates the image bundle by performing the steps of:

generating an altered range image from the altered phase images;

comparing the altered range image to the range image in the image bundle;

declaring the range image altered if the range image and the altered range image do not match;

otherwise, extracting the embedded data from the altered phase images;

separating the digital signature from the embedded data;

decrypting the digital signature to recover the hash value corresponding to the intensity image;

comparing the decrypted hash value with a hash value generated from the intensity image in the image bundle;

declaring the intensity image altered if the two hashes do not match;

otherwise, declaring the intensity image to be authentic.

8. The method as claimed in claim 1 wherein the image bundle further includes a range image generated from the phase offset images and the data includes a digital signature for the range image formed by the steps of:

a) generating a hash value from the range image; and b) encrypting the hash value using a private key to form the digital signature.

9. The method as claimed in claim 7 further comprising a method for authenticating the image bundle by the steps of:

extracting the embedded data from the altered phase images;

separating the digital signature from the embedded data;

decrypting the digital signature to recover the hash value; and comparing the decrypted hash value with a hash value generated from the range image.

10. The method as claimed in claim 8 wherein said method further authenticates the image bundle by performing the steps of:

generating an altered range image from the altered phase images;

comparing the altered range image to the range image in the image bundle;

declaring the range image altered if the range image and the altered range image do not match;

otherwise, extracting the embedded data from the altered phase images;

separating the digital signature from the embedded data;

decrypting the digital signature to recover the hash value corresponding to the range image;

comparing the decrypted hash value with a hash value generated from the range image in the image bundle;

declaring the range image altered if the two hashes do not match;

otherwise, declaring the range image to be authentic.

11. The method as claimed in claim 1 wherein step c) further comprises adding the embedded data to the phase image in the image bundle, pixel by pixel, using modulo-N addition to form an n-bit digital image containing the embedded data.

12. The method as claimed in claim 11 further including the steps of:

extracting the embedded data from the n-bit digital image; and recovering exactly the phase image in the image bundle by subtracting the embedded data from the altered phase image, pixel by pixel, using modulo-N arithmetic.

* * * * *